Dec. 26, 1950     P. D. SEGHERS     2,535,097
BRAKE MECHANISM
Filed March 22, 1945     3 Sheets-Sheet 1
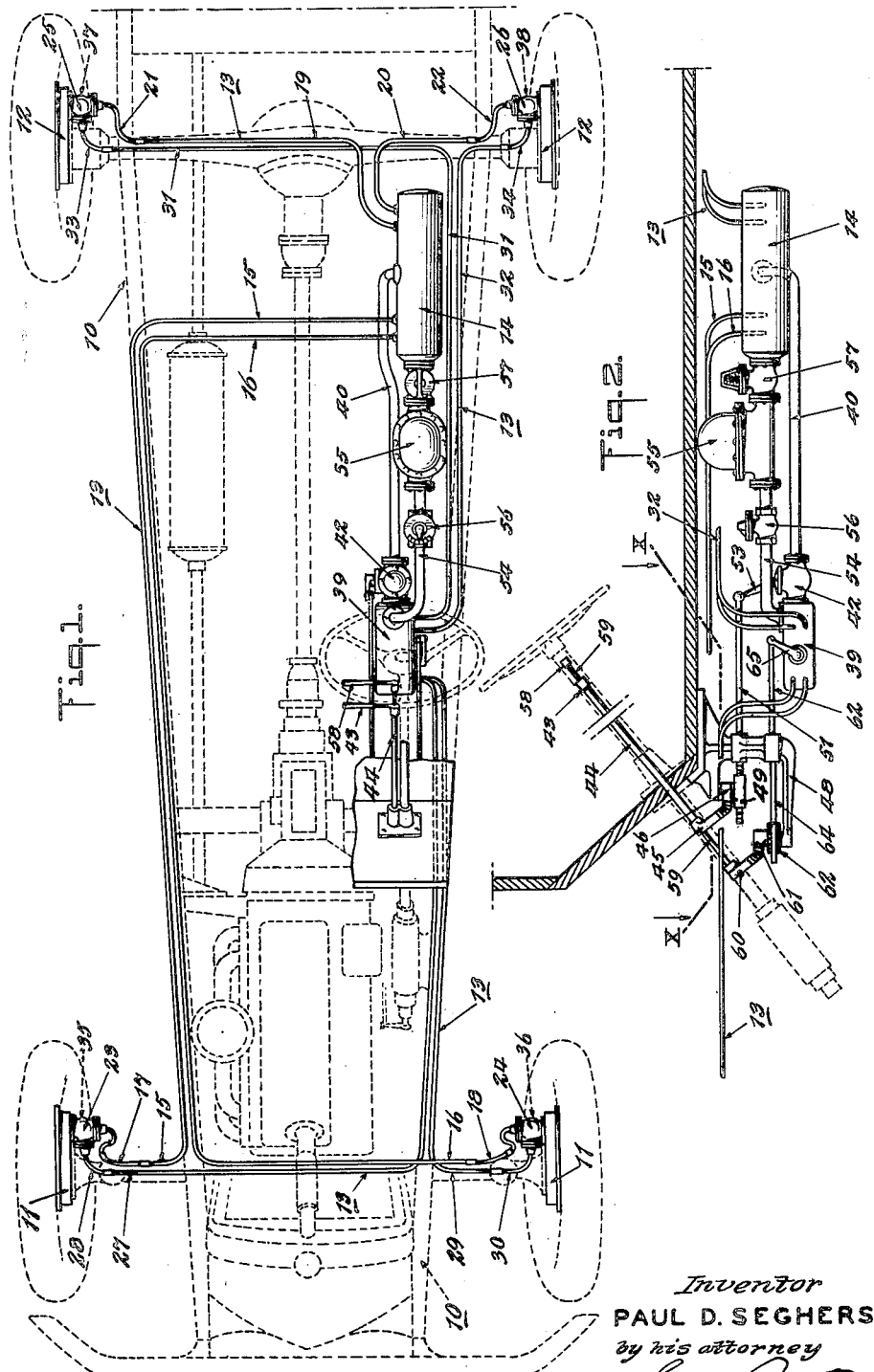
Inventor
PAUL D. SEGHERS
by his attorney

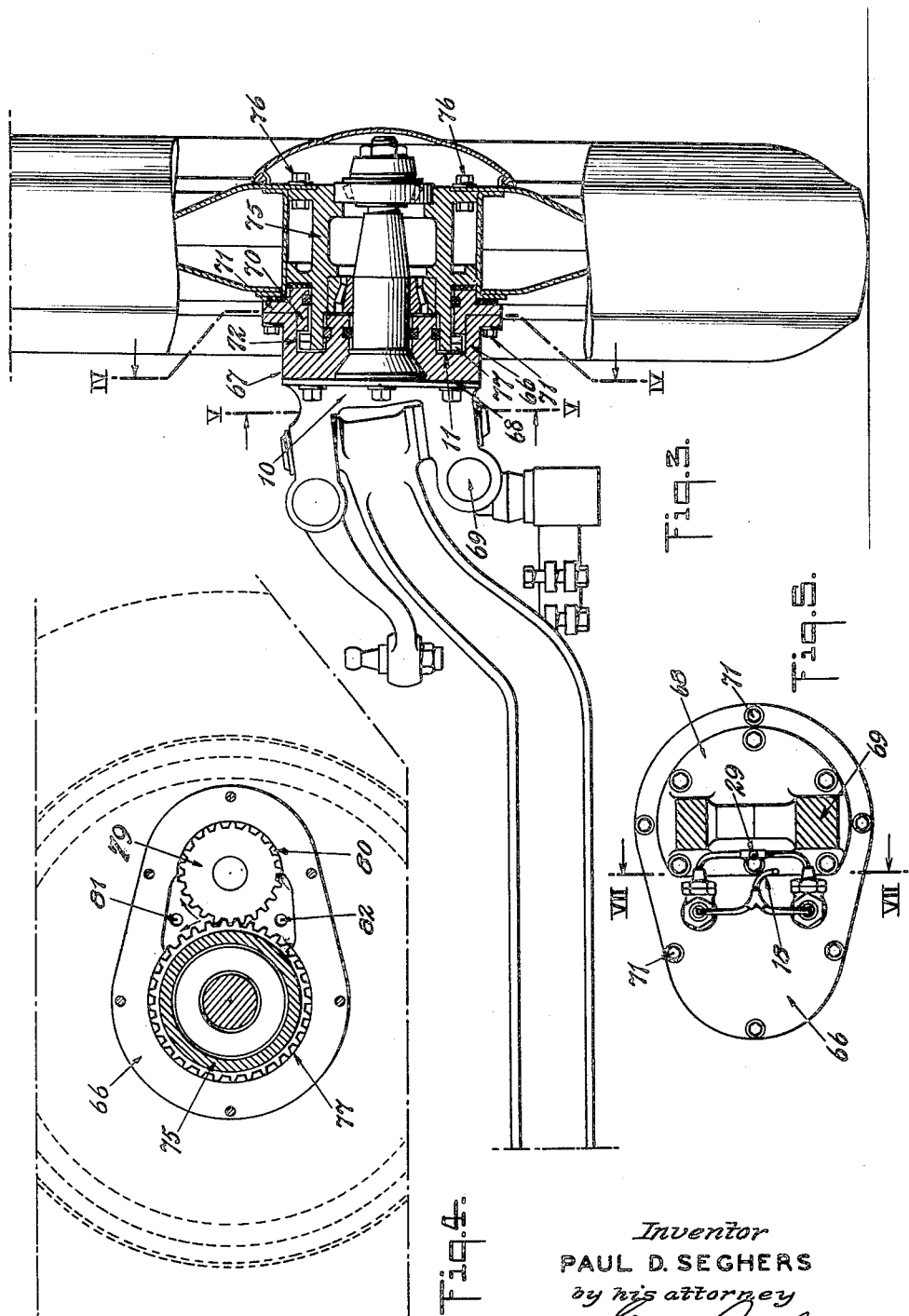

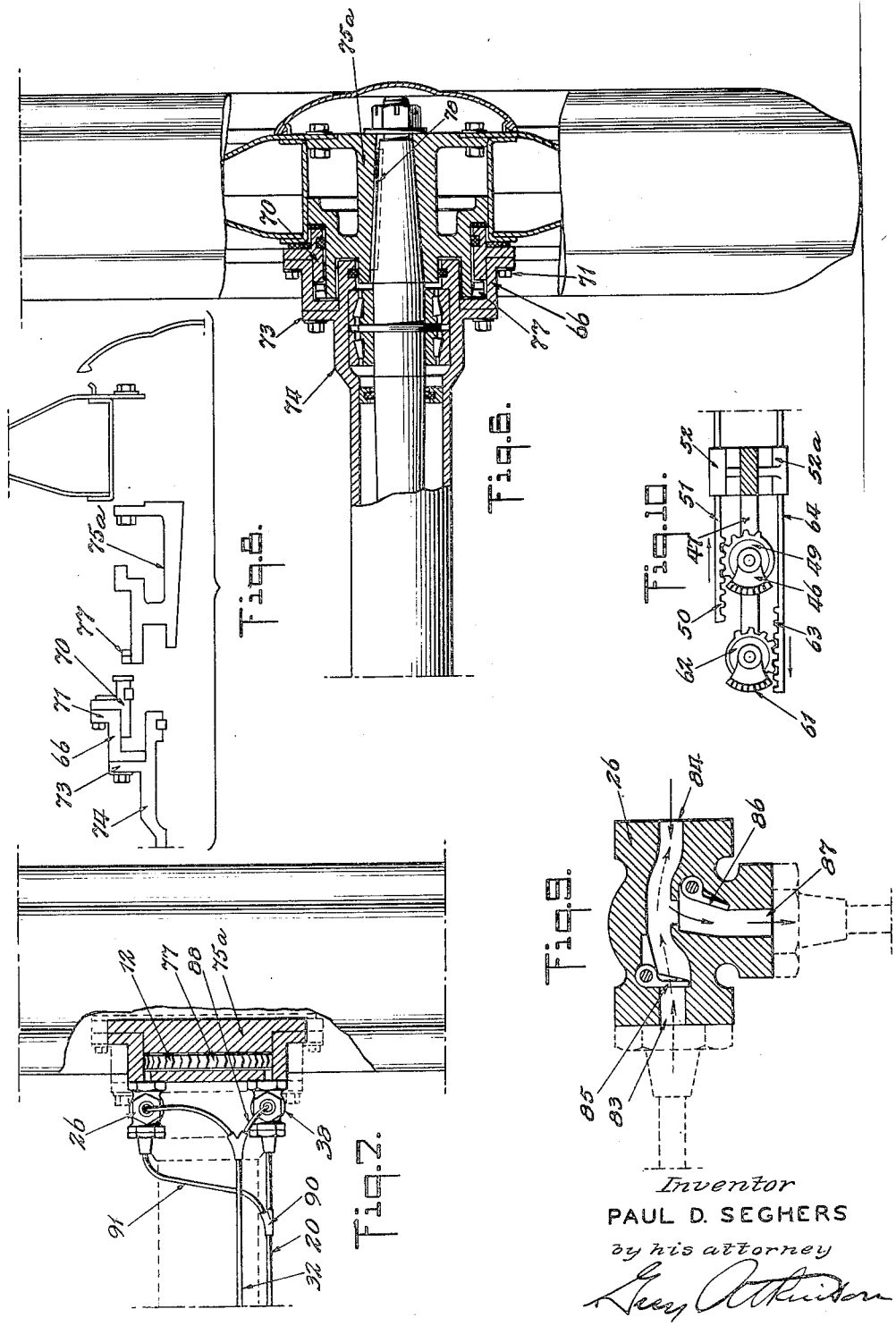

Patented Dec. 26, 1950

2,535,097

UNITED STATES PATENT OFFICE 2,535,097

BRAKE MECHANISM

Paul D. Seghers, New York, N. Y.

Application March 22, 1945, Serial No. 584,121

11 Claims. (Cl. 188—92)

My invention relates to a brake mechanism, and more particularly a brake mechanism wherein braking is effected by the reaction of a fluid against the compression of a pump which is operated by the rotary element to be braked. The invention is especially useful in its application to a wheeled vehicle, to which use, however, it is not limited.

One object of the invention is the elimination of brake bands or other friction elements, together with the slipping, jamming, adjustment and equalization which usually may be expected with friction brakes. Another object of the invention is elimination of the force which must be exerted to operate the usual type of brake. A further object is elimination of failure of the brake through a leak in the "hydraulic" system. Other objects and advantages of the invention will be apparent upon consideration of the present specification.

The invention is shown, by way of illustration, in its application to an automotive wheeled vehicle in the accompanying drawings, wherein—

Figure 1 is a general plan view of the braking system, the wheeled vehicle being shown in broken lines, Fig. 2 is a side elevation of the valve and tank units illustrated in Figure 1, Fig. 3 is a front elevation of the left front wheel assembly, partly in vertical midsection to show the brake unit, Fig. 4 is a broken section taken on the line IV—IV of Fig. 3 showing one of the pump units of the brake mechanism, Fig. 5 is a vertical section taken on the line V—V of Fig. 3 looking in the direction of the arrows, Fig. 6 is a front elevation of the left rear wheel assembly, partly in vertical mid-section to show the brake mechanism, Fig. 7 is a partial front elevation of the left rear wheel, certain parts being cut away and others being shown in section to illustrate the construction of one of the pump units and its connections, Fig. 8 is a semi-diagrammatic view of the pump assembly showing the parts in exploded form, Fig. 9 is a mid-section showing one of the valve units which is associated with each pump, and Fig. 10 is a fragmental view of a part of the valve operating mechanism shown in Fig. 2.

The brake mechanism is illustrated generally in Figure 1 of the drawings, the frame and essential construction of the wheeled vehicle being shown in broken outline and being designated by the numeral 10. Rotary pumps 11, 11 are associated with the front wheels of the vehicle and rotary pumps 12, 12 are associated with each of the rear wheels. One element of each pump is pivoted to a fixed part of the vehicle and the other element rotates with the wheel. Thus, an obstruction or back pressure applied to the discharge of the pumps retards their action and brakes the vehicle.

A circulatory conduit system 13 is provided for supplying fluid to and conducting fluid from each pump. A reservoir 14, through which fluid circulates, is disposed in the conduit system 13. As here shown, the fluid (which may be a liquid, as oil) leaves the reservoir 14 and passes through a low pressure conduit system connecting the reservoir with the inlet port of each pump. Thus, fluid passes from the reservoir 14 through pipes 15 and 16 to the pumps 11, 11 associated with the right and left front wheels respectively. The pipes 15 and 16 have long-radius bends where they turn to permit free flow of the fluid. Suitable flexible sections 17 and 18 are connected in the pipes 15 and 16 respectively adjacent the inlet ports of the pumps 11, 11 associated with the right and left front wheels, in order that the front wheels may be turned for steering the vehicle.

The low pressure conduit system also includes pipes 19 and 20 through which fluid passes from the reservoir 14 to the inlet ports of the pumps 12, 12 associated with the right and left rear wheels respectively. The pipes 19 and 20 are also formed with long-radius bends to permit free flow of the fluid. Suitable flexible sections 21 and 22 are connected in the pipes 19 and 20, respectively, adjacent the inlet ports of the pumps 12, 12, for flexibility.

Two-way valves 23, 24, 25 and 26 are connected in the low pressure conduit system at the inlet ports of the pumps associated with the right and left front wheels and the right and left rear wheels respectively. The function of these two-way valves will be explained at a subsequent point in this specification.

A high pressure conduit system connects the outlet port of each pump to the reservoir 14. Thus, a pipe 27, having a flexible section 28 therein, and having long-radius bends where it turns, carries fluid away from the outlet port of the pump 11 associated with the right front wheel. A pipe 29, having a flexible section 30 therein carries fluid away from the outlet port of the pump 11 associated with the left front wheel. Pipes 31 and 32, similarly formed and having flexible sections 33 and 34, respectively, therein carry fluid from the outlet ports of the pumps 12, 12 associated with the right rear wheel and left rear wheel respectively. Two-way valves 35, 36, 37 and 38 are connected in the high pressure conduit system at the outlet ports of the pumps associated with the right and left front wheels and the right and left rear wheels respectively.

The high pressure conduit pipes 27, 29, 31 and 32 all terminate in a multiple cut-off valve 39 (later to be described) which is in turn connected by a conduit 40 to the reservoir 14. A braking valve 42 is disposed in the high pressure conduit system between the multiple cut-off valve 39 and the conduit 40. No force is required to operate the braking valve 42, and any known means, disposed at any convenient point, may be provided for operating this valve. As here shown, a handle 43 beneath the steering wheel of the vehicle, rotates a tubular rod 44 which passes through the floor of the vehicle. Attached to the lower end of the tubular rod 44 is a bevel-toothed quadrant 45 which is adapted to turn a coacting bevel-toothed quadrant 46 (see Fig. 10) which is pivoted to a bar 47 fixed to a supporting bracket 48 fastened to the vehicle. Fixed to the coacting quadrant 46 is a pinion 49 meshing with a rack 50 formed on the end of a rod 51, which is reciprocable in a bushing 52 on the supporting bracket 48. The rod 51 is pivoted to the end of a crank 53 which controls the braking valve 42. Thus, by turning the handle 43 the braking valve 42 may be opened or closed. Other means could obviously be provided for opening and closing the braking valve.

In order to apply the braking action gradually, a pipe 54 connects the multiple cut-off valve with an air pressure tank 55 into which the braking fluid may pass when its passage into the conduit 40 is restricted or completely cut off. Air in the upper part of the air pressure tank 55 is compressed as the braking fluid enters the tank, and exerts an increasing resilient pressure against the braking fluid. A minimum pressure valve 56 is connected in the pipe 54 between the multiple cut-off valve 39 and the air pressure tank 55, and is so constructed that the pressure required to open it may be conveniently adjusted. Thus, it is possible upon closing the braking valve 42 to have a minimum pressure applied at once to the braking fluid and direct it to the pumps 11, 11 and 12, 12. Back pressure exerted by the air pressure tank will therefore be a pressure in excess of the pressure which the minimum pressure valve 55 imposes upon the high pressure conduit system. A safety valve 57 may connect the air pressure tank 55 with the reservoir 14, thereby preventing excessive pressure from being built up in the air pressure tank 55.

Action of the braking valve and the air pressure tank, as so far described, all takes place with the multiple cut-off valve 39 open. Closing of the multiple cut-off valve will completely cut off flow of braking fluid from the braking valve and from the air pressure tank, and will stop all flow of the braking fluid in the system.

As here shown, a train of elements, similar to that provided for operating the braking valve, is employed for operating the multiple cut-off valve 39. Thus, a handle 58 is fixed to the upper end of a stem 59 adjacent the handle 43. The stem 59 is carried within the tubular rod 44, extending completely therethrough and beyond the bevel-toothed quadrant 45 thereon. A second bevel-toothed quadrant 60 is fixed to the stem 59 at its lower end and meshes with a coacting bevel-toothed quadrant 61 which is journaled, like the first coacting bevel-toothed quadrant 46, in the supporting bracket 48. Unitary with this quadrant 61 is a pinion 62, which meshes with a rack 63 formed on the end of a rod 64, the other end of which is pivoted to a crank 65 for opening and closing the multiple cut-off valve 39. The rod 64 is reciprocable in a bushing 52a formed like the bushing 52 on the supporting bracket 48. Accordingly, the handle 58 may be turned to open, throttle or close the multiple cut-off valve.

Since no force is required to operate the multiple cut-off valve, it is obvious that any suitable operating means, conveniently positioned, may be substituted for the apparatus which has just been described. Flow of fluid through the high pressure conduit system may be throttled or completely cut off by operation of the multiple cut-off valve 39. When the multiple cut-off valve is closed the wheels will be locked, as for parking of the vehicle. Clearly, other and more usual means may replace this means for locking the wheels and holding the car stationary.

Although pumps of different types and designs may be employed in the present brake mechanism, it is preferred to use a rotary pump. A gear pump of convenient design is here shown, and will now be described by way of illustration.

The pumps 11, 11 and 12, 12 are of similar construction, the two pumps on one side of the vehicle being substantially identical, and the two pumps on the opposite side of the vehicle being mirrored reflections of the other two. Fig. 3 shows the pump 11 associated with the left front wheel, one unit 66 of the pump housing 67 being fixed to the frame 10 of the vehicle by being bolted to a flange 68 formed on the steering knuckle 69. The other unit 70 of the pump housing 67 is bolted as at 71 to the first unit 66.

A frame 75 is formed as a unitary part of the wheel hub, being bolted as at 76 to the wheel frame and extending within the chamber 72 formed by the pump housing units 66 and 70, and rotating therein as the wheel revolves. Gear teeth 77 are formed upon that portion of the frame 75 which lies within the pump housing 67.

The pumps 12, 12 are similarly formed and attached. See Fig. 6. Here the unit 66 is bolted to a flange 73 formed on the rear axle housing 74. The unit 70 is bolted as at 71 to the unit 66 and the two units are formed substantially like the corresponding units of the pumps 11, 11.

The frame 75a of the pumps 12, 12 is formed in generally similar manner to the frame 75 of the pumps 11, 11, being merely adapted to fit the revolving rear axle to which it is keyed as at 78. See Fig. 6. Otherwise the frame is like the frame previously described.

The gear teeth 77 which rotate with the frame 75 and the wheel are shown as being of herringbone construction. See Figs. 3, 6 and 7. However, other forms of gear teeth may be employed.

The frame 75 and its gear teeth 77 form one element of the gear pump associated with each wheel. The other element of the gear pump comprises a second wheel 79 having teeth 80 formed thereon and adapted to mesh with the teeth 77. The wheel 79 is pivoted in the pump housing 67 for rotation in the chamber 72 formed therein in conjunction with the frame 75 and the teeth 77 formed thereon, all in a manner well known to those familiar with gear pumps. Fluid from the low pressure conduit system enters each pump through an inlet port 81 and leaves the pump through an outlet port 82, in well known manner.

During this operation the braking fluid enters the pumps through the two-way valves 23, 24, 25 and 26, respectively.

From the foregoing description, operation of the brake mechanism will be easily understood. When the vehicle moves in a forwardly direction, all of the pump frames 75 and 75ª are turned in a direction corresponding to a counterclockwise direction, as viewed in Fig. 4. All of the pump elements 75 and 79 will operate as in the directions indicated in Fig. 4. Accordingly, braking fluid will be caused to enter the inlet ports 81 of the respective pumps and will be pumped out of the outlet ports 82 of these pumps. The multiple cut-off valve 39 and the braking valve 42 being open, the braking fluid will circulate freely through the system.

When it is desired to brake the vehicle, the braking valve 42 is partly closed or completely closed by turning the handle 43. Thereupon passage of the braking fluid to the conduit 40 is restricted or cut off and pressure is built up in the high pressure conduit system. When this pressure becomes sufficiently high, the braking fluid will pass the minimum pressure valve 56 and enter the air pressure tank 55, thereby compressing the air therein, which resiliently opposes the pressure imposed by the pumps upon the braking fluid in the high pressure conduits. Thus the respective gear pumps operate against an increasing back pressure and the vehicle is braked.

It is to be noted that the rate of braking may be influenced by the degree to which the braking valve 42 is closed. A slight closing of this valve merely throttles the passage of fluid and causes the pumps to act against a slight reaction upon the braking fluid. Full closing of the braking valve 42 causes all of the braking fluid pressure to be applied against the minimum pressure valve 56, so that the pressure of this valve is instantly transferred to the pressure side of the pumps, following which the progressively increasing pressure of the air pressure tank 55 is additionally applied until the vehicle is brought to a stop.

Conceivably, excessive pressure might be generated in the air pressure tank 55. Such a condition is prevented by the safety valve 57 which is adapted to relieve pressure in the air pressure tank above a safe maximum, and to permit fluid to pass from the air pressure tank into the reservoir 14.

Special provision is made for braking the vehicle when backing. As is well known, a gear pump will pump in either direction. When the vehicle backs the pumps 11, 11 and 12, 12 apply pressure at their inlet ports and draw braking fluid in through their outlet ports. In order that the braking mechanism may act when the vehicle is backing, it is merely necessary to provide means whereby pressure applied by the pumps at their inlet ports may be transferred from the low pressure conduit system to the high pressure conduit system, and other means whereby braking fluid may enter the outlet ports when the pumps create an absence of pressure at those points.

Such means may be a two-way valve connected at the inlet port and the outlet port of each pump. For purposes of illustration, a very simple form of two-way valve is shown in Fig. 9 of the drawings. In ordinary operation, the braking fluid may be considered as entering this valve at the point 83 and leaving the valves at the point 84, the pressure of the fluid serving to open and maintain in open position a closing element 85 against the action of a weak closing spring (not shown). The flow of braking fluid will then follow the path of the arrows shown in broken line in Fig. 9. Reversal of pressure at the point 84, however, will cause the closing element 85 to close and prevent reversal of flow past the point 83. Such reversal of pressure, on the other hand, will open a second closing element 86 against a stronger closing spring (not shown) and the flow will follow the path of the full line arrows in Fig. 9, the braking fluid leaving the two-way valve at the point 87.

It will be understood that the particular two-way valve here illustrated and described is no part of the invention. Other types of valve may be employed to perform the function of the two-way valve here set forth.

When the two-way valve is connected to the inlet port of the pump, it is connected thereto at the point 84, and the low pressure conduit system is connected to the two-way valve at the point 83. The point 87 is connected by a short lead 88 to a Y 89 in the high pressure system, as the pipe 32. See Fig. 7.

When the two-way valve is connected to the outlet port it is also connected thereto at the point 84. Fluid under pressure thus enters the valve at the point 84 and leaves it at the point 87, where the valve is connected to the high pressure conduit system. When the vehicle is backed and the pump reversed, braking fluid enters the pump from the low pressure conduit system as through a Y 90 in that system, a short lead 91, and the point 83 in the two-way valve. See Fig. 7. The closing element 85 is opened and the second closing element 86 is closed as fluid is drawn into the pump from the point 84.

Thus the pumps always pump fluid into the high pressure conduit system and out of the low pressure conduit system, regardless of the direction in which they are operated; and the brakes, operated as described above, will brake either the forward or backward motion of the vehicle. The two-way valves and cross connections 88 and 91 are accordingly constructed and arranged to provide uni-directional circulation of braking fluid in the system regardless of the direction in which the pumps are rotated.

The multiple cut-off valve 39 stops all flow of braking fluid. By so cutting off the flow of braking fluid, the back pressure against all of the braking pumps approaches infinity and the vehicle may be locked in stationary position for parking.

From the foregoing specification, it will be clear that the present invention provides a brake which is not dependent for its action upon frictional elements with their attendant disadvantages. By merely closing valves instead of tightening frictional elements, it is possible to operate the braking system without the use of physical force. Furthermore a leak in the "hydraulic" system will not result in immediate brake failure because of the reserve supply of braking fluid contained in the reservoir 14. The present braking mechanism may be readily substituted for existing brake mechanisms.

The particular embodiment of the invention here described and illustrated in the accompanying drawings is set forth merely to indicate how the invention may be applied. Other forms, differing in detail but not in principle from that here described and illustrated, which come within the proper scope of the appended claims, will readily suggest themselves to those skilled in the art. For example, although the invention has been described with particular relation to a brake system adapted for use with motor driven vehicles, the invention may obviously be applied to any rotating shaft which it is at times desirable to stop or decelerate.

I claim:

1. Brake mechanism for a wheeled vehicle comprising a rotary pump continuously operated by a wheel of the vehicle, a closed liquid circulating system including a low pressure conduit carrying liquid to the inlet port of said pump and a high pressure conduit carrying liquid from the outlet port of said pump, an air dome, means for connecting the high pressure conduit of said liquid circulating system with said air dome, and means for throttling the liquid circulating system on the low pressure side of said air dome to brake the vehicle.

2. Brake mechanism for a wheeled vehicle comprising a plurality of rotary pumps each operated continuously by a wheel of the vehicle, a liquid circulating system including a low pressure conduit carrying liquid to the inlet portion of each pump and a high pressure conduit carrying liquid from the outlet port of each pump, an air pressure tank, and means for connecting the high pressure conduit of said liquid circulating system with said air pressure tank, and means for throttling the liquid circulating system on the low pressure side of said air pressure tank to brake the vehicle.

3. A brake mechanism for a wheeled vehicle comprising a gear pump associated with each of a plurality of wheels for continuous operation thereby, a circulatory conduit system for supplying fluid to and conducting fluid from each pump, a fluid reservoir in said conduit system, and an air pressure tank, in combination with a valve in said conduit system on the pressure side of said pumps connected with said tank with said valve in one position and with said reservoir with said valve in another position, whereby said pumps may be caused to operate against the back pressure of air in said tank for braking the vehicle and whereby said pumps may be disconnected from said tank and connected with said reservoir to relieve braking action.

4. A brake mechanism for a wheeled vehicle comprising a rotary pump associated with each wheel for continuous operation thereby, a circulatory conduit system for supplying fluid to and conducting fluid from each pump, a fluid reservoir in said conduit system, and an air pressure tank, in combination with a valve in said conduit system on the pressure side of said pumps connected with said tank with said valve in one position and with said reservoir with said valve in another position whereby said pumps may be caused to operate against the back pressure of air in said tank for braking the vehicle and whereby said pumps may be disconnected from said tank and connected with said reservoir to relieve braking action, and a safety valve connected between said air pressure tank and said reservoir for relieving excess pressure in said tank.

5. A brake mechanism for a wheeled vehicle comprising a gear pump associated with each wheel, a fluid reservoir, a low pressure conduit system connecting said reservoir with the inlet port of each gear pump, a high pressure conduit system connecting the outlet port of each gear pump with said reservoir, and an air pressure tank, in combination with a valve in said high pressure conduit system connected with said reservoir whereby said reservoir may be shut off from said high pressure conduit system and said pumps may be caused to operate against the back pressure of said tank for braking the vehicle.

6. A brake mechanism for a wheeled vehicle comprising a gear pump associated with each wheel, a fluid reservoir, a low pressure conduit system connecting said reservoir with the inlet port of each gear pump, a high pressure conduit system connecting the outlet port of each gear pump with said reservoir, and an air pressure tank, in combination with a valve in said high pressure conduit system connected with said reservoir whereby said reservoir may be shut off from said high pressure conduit system and said pumps may be caused to operate against the back pressure of said tank for braking the vehicle, and a minimum pressure valve disposed between said first-named valve and said tank for imposing a minimum pressure upon the fluid in said high pressure conduit system when said first-named valve shuts off said high pressure conduit system from said reservoir.

7. A brake mechanism for a wheeled vehicle comprising a gear pump associated with each wheel, a fluid reservoir, a low pressure conduit system connecting said reservoir with the inlet port of each gear pump, a high pressure conduit system connecting the outlet port of each gear pump with said reservoir, and an air pressure tank, in combination with a multiple cut-off valve in said high pressure conduit system for completely cutting off flow in said system, a brake control valve disposed between said multiple cut-off valve and said reservoir, for throttling or completely cutting off flow from said pumps into said reservoir, and a minimum pressure valve connecting said high pressure conduit system with said air pressure tank from a point between said multiple cut-off valve and said brake control valve for imposing a minimum pressure upon the fluid in said high pressure conduit system as said brake control valve is moved from open toward closed position.

8. A brake mechanism for a wheeled vehicle comprising a gear pump associated with each wheel, a circulatory conduit system for supplying fluid to and conducting fluid from each gear pump, a fluid reservoir in said conduit system, and an air pressure tank, in combination with a valve in said conduit system on the pressure side of said pumps connected with said tank, whereby said pumps may be caused to operate against the back pressure of said tank for braking the vehicle, and a safety valve connecting said tank with said reservoir for relieving excessive pressure in said tank.

9. A brake mechanism for a wheeled vehicle comprising a gear pump associated with each wheel, a fluid reservoir, a low pressure conduit system connecting said reservoir with the inlet port of each gear pump, a high pressure conduit system connecting the outlet port of each gear pump with said reservoir, and an air pressure tank, in combination with a multiple cut-off valve in said high pressure conduit system for completely cutting off flow in said system, a brake control valve disposed between said multiple cut-off valve and said reservoir for throttling or completely cutting off flow from said pumps into said reservoir, and a safety valve connecting said tank with said reservoir for relieving excessive pressure in said tank, substantially as described.

10. Brake mechanism for a wheeled vehicle comprising a rotary pump operated by a wheel of the vehicle, a liquid circulating system including said pump, resilient means for opposing circulation of liquid in said system, and a control for applying and cutting out said opposing means, in combination with a two-way valve in said system at the intake port of said pump, a two-way valve in said system at the outlet port of said pump, a cross connection from each two-way valve connected in said system beyond the other two-way valve, said two-way valves and said cross connections being constructed and arranged to provide uni-directional circulation of liquid in said system regardless of the direction in which said pump is rotated.

11. A brake mechanism for a wheeled vehicle comprising a gear pump associated with each wheel, a fluid reservoir, a low pressure conduit system connecting said reservoir with the inlet port of each gear pump, a high pressure conduit system connecting the outlet port of each gear pump with said reservoir, a two-way valve in said system at the intake port of each of said pumps, a two-way valve in said system at the outlet port of each of said pumps, a cross connection joining said two-way valve at the intake port of each pump with the high pressure conduit system, a cross connection joining said two-way valve at the outlet port of each pump with said low pressure conduit system, said cross connections being constructed and arranged to provide uni-directional circulation of liquid in said system regardless of the direction in which said pump is rotated, and a brake control valve in said high pressure conduit system.

PAUL D. SEGHERS.

REFERENCES CITED

The following references are of record in the file of this patent:

UNITED STATES PATENTS

| Number | Name | Date |
|---|---|---|
| 701,118 | Wood | May 27, 1902 |
| 1,009,651 | Mars | Nov. 21, 1911 |
| 1,608,417 | Otto | Nov. 23, 1926 |
| 1,625,543 | Hutchinson | Apr. 19, 1927 |
| 1,821,178 | Fisher | Sept. 1, 1931 |
| 1,940,925 | Walker | Dec. 26, 1933 |
| 2,106,493 | Byers | Jan. 25, 1938 |